Jan. 25, 1966  E. G. KAMINSKI ET AL  3,231,065
ARTICLE FEEDING APPARATUS
Filed Jan. 14, 1963

INVENTOR.
ELTON G. KAMINSKI AND
RALPH J. STOLLE,
BY
ATTORNEYS.

United States Patent Office 3,231,065
Patented Jan. 25, 1966

3,231,065
ARTICLE FEEDING APPARATUS
Elton G. Kaminski, Sidney, and Ralph J. Stolle, Oregonia, Ohio, assignors to The Stolle Corporation, Sidney, Ohio, a corporation of Ohio
Filed Jan. 14, 1963, Ser. No. 251,245
4 Claims. (Cl. 198—131)

This relates to an article feeding apparatus and more specifically to an apparatus suitable for feeding a succession of articles upon which a series of operations is to be performed, in a step by step manner, along a path so as to deliver each article in succession to a plurality of operating stations at which certain operations are to be performed upon it.

Most intermittent feed conveyors are of the rotary type wherein the articles to be operated upon are fed in succession onto a conveyor wheel which then indexes intermittently through a series of positions at which a number of operations may be carried out upon the article. In order to provide for high speed production it is necessary that the feed be extremely accurate such that each article is presented in its indexed position in exactly correct orientation for the operation which is to be performed upon it. This is difficult to accomplish with the types of apparatus heretofore known. Furthermore, one of the problems in intermittent feed apparatus is the problem of inertia. The turret type of apparatus requires a relatively heavy element to be started up from a standstill, moved through a certain part and brought to a stop. This requires complicated apparatus and excessive amount of power.

With the foregoing considerations in mind, it is the principal object of the present invention to provide a feed mechanism whereby there is a minimum of inertia in the moving parts such that starting and stopping intermittently does not present a serious problem. It is another object of the invention to provide an apparatus of the character described wherein the intermittent feed can be extremely accurate without the need for complex mechanism heretofore necessary for accurate positioning of the workpieces.

These and other objects of the invention which will be described in more detail hereinafter or which will become apparent to those skilled in the art upon reading these specifications are accomplished by that certain construction and arrangement of parts of which the following is a description of an exemplary embodiment.

Reference is made to the drawing forming a part hereof and in which.

Figure 1:
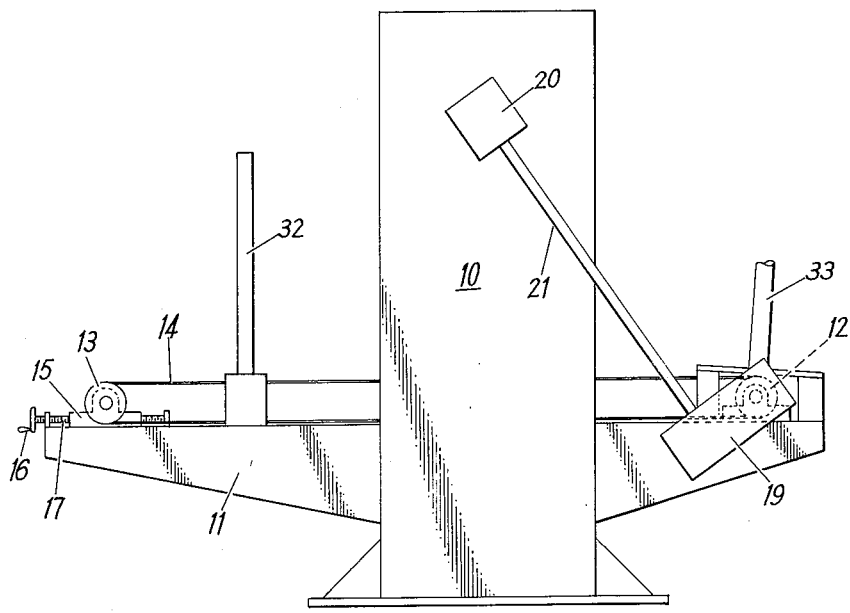
FIG. 1 is a somewhat diagrammatic elevational view of an apparatus according to the invention.

Briefly, in the practice of the invention there are provided a pair of spaced drums around which a belt of substantially non-stretchable material passes. One of the drums is mounted upon a carriage which may be adjusted toward and away from the other drum so as to provide means for tensioning the belt and the other drum is provided with an intermittent driving means of any known of desired construction. The driving drum is provided with at least one and preferably two sprocket discs and the belt is provided with very accurately formed sprocket holes along at least one and preferably along both edges, which sprocket holes are adapted to engage the sprocket teeth on the driving drum. The accurately formed sprocket holes cooperating with the sprocket discs secured to the driving drum provide for highly accurate indexing of the endless belt. The belt itself is provided with means of any suitable kind for carrying or holding the workpieces. These means will of course be varied to suit the particular workpiece in question.

In the drawings, by way of example, there is shown an apparatus which is specifically designed for handling beer can tops where it is desired to perform a series of operations on such tops and for this purpose the abutments are in the form of circular holes in which the beer can tops are seated.

Referring now in more detail to the drawing, the machine comprises a frame generally indicated at 10, which frame as will be understood will serve to carry the apparatus for operating on the articles. In the case of the particular machine disclosed, this included a plurality of cooperating dies, but since these do not form any part of the present invention they are not shown.

The frame 10 is also provided with a bed 11 which serves as a support for the conveying apparatus which does form the object of the present invention. Basically this conveying apparatus is constituted by a driving drum 12 and an idler drum 13 and a belt 14 of substantially non-stretchable material passing around said drums. The driving drum 12 is fixed as to its position while the idler drum 13 is rotatably mounted on a carriage 15 which may be adjusted by means of hand wheel 16 to adjust the distance between the drums 12 and 13. The adjusting means may comprise a screw 17 in threaded engagement with a nut or the like on the carriage 15.

A suitable drive mechanism is provided for the shaft 18 on which the driving drum 12 is mounted. This drive may be any of the well known intermittent drives such as for example a "Ferguson" drive and it is indicated diagrammatically in the drawings at 19. Power may be supplied to this drive from a motor or the line 20 through a shaft 21. Since the intermittent drive mechanism forms no part of the present invention it has not been described in detail.

Figures 3, 4, 5:
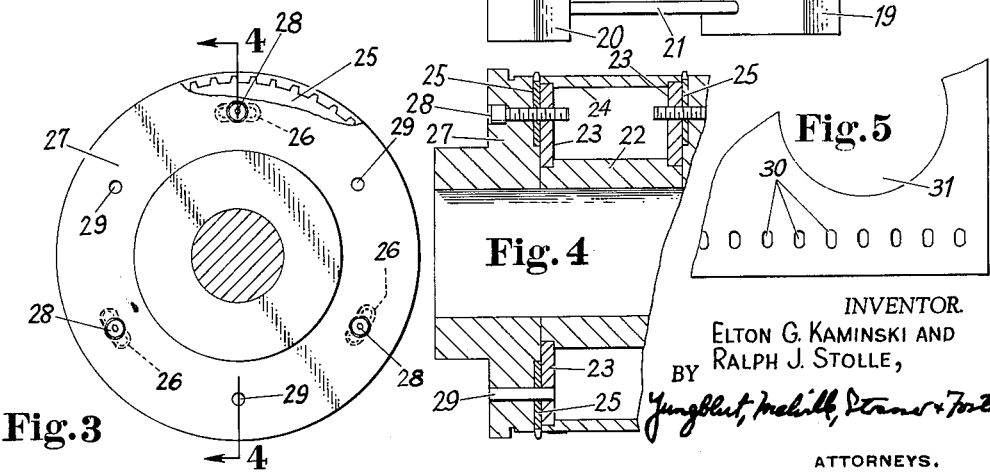
FIG. 3 is an elevational view partly in cross section on a greatly enlarged scale taken on the line 3—3 of FIG. 2.
FIG. 4 is a fragmentary cross-sectional view taken on the line 4—4 of FIG. 3.
FIG. 5 is a fragmentary view also on an enlarged scale of the endless belt.

The driving drum 12 is shown in greater detail in FIGURE 4 and in the interests of cutting down weight, it is constituted essentially by a hub 22 and a pair of wide plates 23 and a rim 24. This provides a hollow annular chamber and considerably lightens the drum. In the preferred embodiment, each side of the drum is provided with a sprocket disc. These discs are indicated at 25. Each of the sprocket discs in the specific embodiment shown is provided with arcuate slots 26 and the sprocket discs are clamped on to the drum by means of the end members 27 and the bolts 28. The bolts 28 are threaded into the members 23 and pass through the arcuate slots 26. In this way the drum may be assembled and the end members 27 and sprocket discs 25 may be more or less lightly clamped in place and then the sprocket discs may be rotated slightly for very accurate alignment. Thereupon the bolts 28 may be tightened and the assembly may be fixed for drilling of the assembly and pegging by means of the pegs 29.

The belt 14 may be of any suitable substantially non-stretchable material, whether it be metallic or non-metallic. In the particular embodiment shown the belt is made of stainless steel. The belt is made endless in any desired manner as, for example, by riveting or welding or if the belt is of non-metallic material it may be adhesively secured. For accurate indexing without slip, the belt is provided preferably along both edges with the sprocket holes 30 which are arranged to cooperate with the teeth of the sprockets 25. It will be understood that the sprocket holes and teeth are not required to drive the belt from the drums but simply to maintain accurate orientation of the jigs or fixtures or other abutments provided in the belt to hold the articles being processed.

In the particular embodiment shown, when the articles being processed are beer can lids, the locating elements for the articles being processed are in the form of equally spaced holes 31 in which the beer can lids are seated. It will be understood that the locating elements may be of any desired or necessary type and this may include circular or other shaped holes, slots or suitable jigs or fixtures secured to the belt.

It will be understood that if the accuracy of spacing between the fixtures or holes 31 is made very accurately and if the sprocket holes 30 are made accurately and the sprocket discs 25 are accurately oriented and aligned, the articles carried by the belt will be moved successively in exact increments, so that a series of operations may be carried out upon them. It will be clear that multiple rows of articles may be conveyed by means of the belt in any desired arrangement.

Previous attempts to move articles linearly by means of a belt have failed because chains have been used and accurate indexing cannot be accomplished with conventional chain because of the relatively loose chain manufacturing tolerances. These tolerances are cumulatice and thus they destroy the accurate indexing relationship between the article and the station at which an operation is to be performed upon the article. Furthermore, since the endless belt is substantially not stretchable and by virtue of the edge holes 30 and the sprocket discs 25, and the accurate positioning of the holes 31, perfect registration is maintained between the article centers, and between the article centers and the edge holes, and therefore between the article centers and the driving drum.

Figure 2:
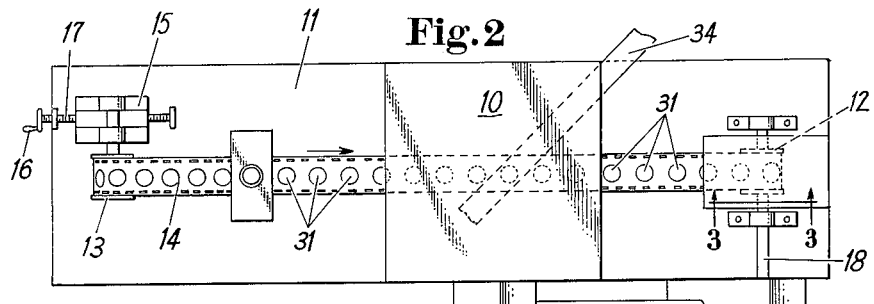
FIG. 2 is a plan view of the same.

In FIGURES 1 and 2 there are diagrammatically indicated a feeding hopper 32 which may contain a stack of beer can lids or the like which are fed off the bottom into the holes 31 in the belt, and adjacent the drive drum 12 there is indicated a stacker 33 for the completed articles. The completed articles may of course be permitted to fall from the belt by gravity as it passes over the drum 12 and may be collected in a suitable chute or hopper or they may be pushed up from beneath into a stacking device as diagrammatically indicated at 33. These devices do not constitute a part of the present invention and are therefore not disclosed in detail.

It will be understood that the apparatus herein described may be used in performing a series of operations upon a workpiece and also in assembly operations. Thus, for example, there is diagrammatically illustrated at 34 a lateral conveyor which may be operated in timed relation to the belt 14 and which may feed elements into position for assembly to the elements being carried by the belt 14 at any one of the operating stations. Since the details of such conveyors do not form a part of the invention, they are not illustrated other than diagrammatically.

The description herein has been by way of example and no limitations are intended which are not specifically set forth.

What is claimed as new is:

1. Apparatus for intermittently feeding a series of like articles along a path so as to present them in succession to a plurality of operation stations where operations are performed upon said articles in sequence, comprising a pair of spaced drums mounted on parallel axes, and a one-piece substantially non-stretchable belt passing around said drums, means for intermittently driving one of said drums whereby to move said belt intermittently a predetermined distance, said one of said drums having at least one set of peripheral teeth provided by a sprocket disc, wherein means are provided for securing said sprocket disc to said drum in a desired position of orientation, and said belt having at least one series of spaced holes arranged to cooperate with said teeth for maintaining the orientation of said belt with respect to said one of said drums, said belt being provided with locating elements equally spaced therealong for positioning said articles in equally spaced relation along said belt.

2. Apparatus according to claim 1, wherein said sprocket disc has a plurality of arcuate slots, and said securing means include a plurality of bolts passing through said slots respectively and threaded into said drum, whereby sad sprocket disc may be rotated with respect to said drum and clamped in a desired position of adjustment.

3. Apparatus according to claim 2, wherein said securing means include also at least one peg passing through holes in said drum and said disc, said last named holes and peg fixing the desired position of adjustment of said disc with respect to said drum.

4. Apparatus for intermittently feeding a series of like articles along a path so as to present them in succession to a plurality of operation stations where operations are performed upon said articles in sequence, comprising a pair of spaced drums mounted on parallel axes, and a one-piece substantially non-stretchable belt passing around said drums, means far intermittently driving one of said drums whereby to move said belt intermittently a predetermined distance, said one of said drums having at least one set of peripheral teeth, and said belt having at least one series of spaced holes arranged to cooperate with said teeth for maintaining the orientation of said belt with respect to said one of said drums, said belt being provided with locating elements equally spaced therealong for positioning said articles in equally spaced relation along said belt, wherein said locating elements are constituted by equally spaced holes in said belt into which said articles fit.

References Cited by the Examiner
UNITED STATES PATENTS

| | | | |
|---|---|---|---|
| 1,843,208 | 2/1932 | Cutler | 198—184 |
| 2,258,880 | 10/1941 | Bobst | 271—50 |
| 2,639,025 | 5/1953 | Schmitt | 198—184 |
| 2,784,834 | 3/1957 | Trinkle | 198—184 |
| 2,828,001 | 3/1958 | Bornemann | 198—131 |
| 2,855,093 | 10/1958 | Ek | 198—193 |
| 2,946,428 | 7/1960 | Baker | 198—193 |
| 3,064,663 | 11/1962 | Sariotti | 198—131 X |

ROBERT B. REEVES, *Primary Examiner.*

RAPHAEL M. LUPO, SAMUEL F. COLEMAN, W. F. McCARTHY, *Assistant Examiners.*